(12) United States Patent
Lilja et al.

(10) Patent No.: US 11,662,461 B2
(45) Date of Patent: May 30, 2023

(54) METHOD FOR GENERATING A DYNAMIC OCCUPANCY GRID

(71) Applicant: Aptiv Technologies Limited, St. Michael (BB)

(72) Inventors: Adam Mats John Lilja, Gothenburg (SE); Markus Pär Oscar Carlander, Hisings-Kärra Gothenburg (SE)

(73) Assignee: Aptiv Technologies Limited, St. Michael (BB)

( * ) Notice: Subject to any disclaimer, the term of this patent is extended or adjusted under 35 U.S.C. 154(b) by 276 days.

(21) Appl. No.: 17/196,919

(22) Filed: Mar. 9, 2021

(65) Prior Publication Data

US 2021/0291816 A1 Sep. 23, 2021

(30) Foreign Application Priority Data

Mar. 20, 2020 (EP) ..................................... 20164443

(51) Int. Cl.
*G06V 20/59* (2022.01)
*G01S 13/931* (2020.01)
(Continued)

(52) U.S. Cl.
CPC ........... *G01S 13/931* (2013.01); *B60W 30/08* (2013.01); *G06V 20/58* (2022.01); *G06V 20/588* (2022.01); *G06V 20/59* (2022.01); *B60W 2552/10* (2020.02)

(58) Field of Classification Search
CPC .... B60W 40/072; B60W 30/12; B60W 30/14; B60W 60/001; B60W 2420/42; B60W 2420/52; B60W 2510/20; B60W 2520/14; B60W 2552/53; G06K 9/6288; G06T 11/00; G06V 10/44; G06V 20/588; G06V 10/814
See application file for complete search history.

(56) References Cited

U.S. PATENT DOCUMENTS 7,124,027 B1  10/2006  Ernst, Jr. et al.
7,189,769 B2   3/2007  Cody et al.
(Continued)

FOREIGN PATENT DOCUMENTS

CN  103559791 A   2/2014
CN  111401208 A   7/2020
(Continued)

OTHER PUBLICATIONS

"Extended European Search Report", EP Application No. 21157127.8, dated Jul. 9, 2021, 10 pages.
(Continued)

*Primary Examiner* — Kenneth J Malkowski
(74) *Attorney, Agent, or Firm* — Sawtooth Patent Group PLLC

(57) ABSTRACT

A computer implemented method is provided for generating a dynamic occupancy grid in front of a host vehicle. An indicator is detected for the course of a lane of a road in front of the host vehicle, and a base area is determined based on the detected indicator, wherein the base area is restricted to a region of interest in front of the host vehicle. A plurality of cells is defined by dividing the base area in order to form the occupancy grid. For each cell of the occupancy grid, it is determined whether the cell is occupied at least partly by a detectable object.

20 Claims, 3 Drawing Sheets

(51) Int. Cl.
*B60W 30/08* (2012.01)
*G06V 20/58* (2022.01)
*G06V 20/56* (2022.01)

(56) References Cited

U.S. PATENT DOCUMENTS

| | | |
|---|---|---|
| 8,930,060 B1 | 1/2015 | Lu et al. |
| 9,470,777 B2 | 10/2016 | Arage |
| 9,738,278 B2 | 8/2017 | Hasberg et al. |
| 10,303,178 B1 | 5/2019 | Gutmann |
| 10,303,492 B1 | 5/2019 | Wagner et al. |
| 10,430,641 B2 | 10/2019 | Gao |
| 10,885,353 B2 | 1/2021 | Watanabe et al. |
| 10,909,411 B2 | 2/2021 | Sano et al. |
| 11,016,492 B2 | 5/2021 | Gier et al. |
| 11,073,832 B1 | 7/2021 | Gutmann |
| 11,132,611 B2 | 9/2021 | Sano et al. |
| 11,195,028 B2 | 12/2021 | Lee et al. |
| 11,222,438 B2 | 1/2022 | Sano et al. |
| 11,250,288 B2 | 2/2022 | Sano et al. |
| 11,276,189 B2 | 3/2022 | Niesen et al. |
| 11,353,577 B2 | 6/2022 | Liu et al. |
| 11,393,097 B2 | 7/2022 | Brunner et al. |
| 11,475,678 B2 | 10/2022 | Myeong et al. |
| 11,530,921 B2 | 12/2022 | Nimmagadda et al. |
| 11,544,940 B2 | 1/2023 | Baik et al. |
| 11,555,927 B2 | 1/2023 | Huang et al. |
| 2007/0005306 A1 | 1/2007 | Foessel |
| 2009/0143951 A1 | 6/2009 | Takahashi et al. |
| 2012/0053755 A1 | 3/2012 | Takagi |
| 2015/0012204 A1 | 1/2015 | Breuer et al. |
| 2015/0353062 A1 | 12/2015 | Breuer et al. |
| 2015/0353083 A1 | 12/2015 | Hasberg et al. |
| 2016/0116916 A1 | 4/2016 | Pink et al. |
| 2017/0344844 A1 | 11/2017 | Sano et al. |
| 2017/0344888 A1 | 11/2017 | Sano et al. |
| 2017/0345182 A1 | 11/2017 | Sano et al. |
| 2018/0074507 A1 | 3/2018 | Gao et al. |
| 2018/0188059 A1 | 7/2018 | Wheeler et al. |
| 2018/0189599 A1 | 7/2018 | Sano et al. |
| 2018/0239969 A1 | 8/2018 | Lakehal-ayat et al. |
| 2018/0329034 A1 | 11/2018 | Bilik et al. |
| 2018/0350086 A1 | 12/2018 | Sweet, III et al. |
| 2019/0050649 A1 | 2/2019 | Watanabe et al. |
| 2019/0271549 A1 | 9/2019 | Zhang et al. |
| 2019/0286153 A1 | 9/2019 | Rankawat et al. |
| 2019/0318176 A1 | 10/2019 | Sano et al. |
| 2019/0340775 A1 | 11/2019 | Lee et al. |
| 2019/0384302 A1 | 12/2019 | Silva et al. |
| 2020/0103523 A1 | 4/2020 | Liu et al. |
| 2020/0139959 A1 | 5/2020 | Akella et al. |
| 2020/0183011 A1* | 6/2020 | Lin .............. G01C 21/3881 |
| 2020/0217950 A1 | 7/2020 | Unnikrishnan et al. |
| 2020/0218907 A1 | 7/2020 | Baik et al. |
| 2020/0218908 A1 | 7/2020 | Lee et al. |
| 2020/0218909 A1 | 7/2020 | Myeong et al. |
| 2020/0218913 A1 | 7/2020 | Unnikrishnan et al. |
| 2020/0219264 A1 | 7/2020 | Brunner et al. |
| 2020/0240795 A1* | 7/2020 | Nomura .............. G08G 1/09 |
| 2020/0249356 A1 | 8/2020 | Huang et al. |
| 2020/0250485 A1 | 8/2020 | Nagori et al. |
| 2020/0334544 A1 | 10/2020 | Liu et al. |
| 2020/0356415 A1 | 11/2020 | Goli |
| 2020/0378766 A1* | 12/2020 | Omari .............. G01S 5/18 |
| 2020/0391729 A1 | 12/2020 | Liu et al. |
| 2021/0101624 A1 | 4/2021 | Philbin et al. |
| 2021/0131823 A1* | 5/2021 | Giorgio .............. G06V 10/803 |
| 2021/0181750 A1 | 6/2021 | Gogna et al. |
| 2021/0188286 A1 | 6/2021 | Ma et al. |
| 2021/0278853 A1 | 9/2021 | Gier et al. |
| 2021/0291816 A1 | 9/2021 | Lilja et al. |
| 2021/0300353 A1 | 9/2021 | Carlander et al. |
| 2021/0331679 A1 | 10/2021 | Lilja et al. |
| 2021/0333380 A1 | 10/2021 | Lilja et al. |
| 2021/0394761 A1 | 12/2021 | Steyer et al. |
| 2022/0057232 A1 | 2/2022 | Shen et al. |
| 2022/0180537 A1 | 6/2022 | Niesen et al. |
| 2022/0373353 A1 | 11/2022 | Ding |

FOREIGN PATENT DOCUMENTS

| | | |
|---|---|---|
| DE | 102009009047 A1 | 8/2010 |
| DE | 102009022588 | 12/2010 |
| DE | 102016007630 | 12/2017 |
| DE | 102017217972 A1 | 4/2019 |
| DE | 102017126388 A1 | 5/2019 |
| DE | 102019205008 | 7/2020 |
| EP | 3364534 A1 | 8/2018 |
| GB | 2560322 A | 9/2018 |
| JP | 2018138402 | 9/2018 |
| WO | 2020140047 A1 | 7/2020 |

OTHER PUBLICATIONS

Joubert, et al., "Pose Uncertainty in Occupancy Grids through Monte Carlo Integration", Aug. 17, 2014, 6 pages.

Jungnickel, et al., "Efficient Automotive Grid Maps using a Sensor Ray based Refinement Process", Jul. 9, 2021, 8 pages.

"Extended European Search Report", EP Application No. 20164443.2, dated Sep. 9, 2020, 10 pages.

"Extended European Search Report", EP Application No. 20171489.6, dated Sep. 18, 2020, 11 pages.

"Extended European Search Report", EP Application No. 20171491.2, dated Sep. 28, 2020, 9 pages.

"Extended European Search Report", EP Application No. 20166617.9, dated Oct. 7, 2020, 7 pages.

Casapietra, et al., "Building a Probabilistic Grid-based Road Representation from Direct and Indirect Visual Cues", Jun. 2015, 8 pages.

Kunz, et al., "Fast Collision Checking with a Frenet Obstacle Grid for Motion Planning", Jun. 2014, pp. 95-104.

Nuss, "Consistent Environmental Modeling by use of Occupancy Grid Maps, Digital Road Maps, and Multi-Object Tracking", Jun. 2014, 7 pages.

Sundram, et al., "Development of a Miniature Robot for Multi-robot Occupancy Grid Mapping", Jul. 2018.

Weiss, "Robust Driving Path Detection in Urban and Highway Scenarios Using a Laser Scanner and Online Occupancy Grids", Jul. 2007, pp. 184-189.

"Extended European Search Report", EP Application No. 20209230.0, dated May 4, 2021, 10 pages.

"Extended European Search Report", EP Application No. 20211232.2, dated May 25, 2021, 10 pages.

"Extended European Search Report", EP Application No. 20214293.1, dated May 27, 2021, 10 pages.

Aihara, et al., "Free-Space Estimation for Self-Driving System Using Millimeter Wave Radar and Convolutional Neural Network", Mar. 2019, 4 pages.

BestTong ABS Plastic Junction Box . . . , available in Amazon.com, First available date Dec. 21, 2013, [Dec. 8, 2021], Available from the internet URL: https://www.amazon.com/dp/B016FCZPTM/ref=cm_sw_em_r_mt_dp_BTHQC2BSJT2JGAAAPJM4?_encoding=UTF8&psc=1 (Year: 2013).

C. Pfeffer, R. Feger, C. Wagner, and A. Stelzer, "FMCW MIMO radar system for frequency-division multiple TX-beamforming," IEEE Trans. Microw. Theory Techn., vol. 61, No. 12, pp. 42624274, Dec. 2013.

Chakraborty, et al., "An Overview of Face Liveness Detection", Apr. 2004, 15 pages.

Foroughi, et al., "Free Space Grid for Automotive Radar Sensors", Sep. 2015, pp. 249-256.

Gorzelany, et al., "Safety Last? Driver-Assist Features That Are Most Often Switched off", Jul. 7, 2000, 5 pages.

Jianyu Chen, et al., "Constrained Iterative LQR for on-Road Autonomous Driving Motion Planning", 2017 IEEE 20th International Conference on Intelligent Transportation Systems (ITSC), Oct. 2017, 7 pages.

(56) References Cited

OTHER PUBLICATIONS

Jun Ma, et al., "Alternating Direction Method of Multipliers for Constrained Iterative LQR in Autonomous Driving", Nov. 1, 2020, 9 pages.
Li, et al., "High Resolution Radar-based Occupancy Grid Mapping and Free Space Detection", Mar. 2018, pp. 70-81.
Liang, et al., "PolyTransform: Deep Polygon Transformer for Instance Segmentation", Jan. 16, 2021, 10 pages.
Ling, et al., "Shooting and Bouncing Rays: Calculating the RCS of an Arbitrarily Shaped Cavity", Feb. 1989, pp. 194-205.
Liou, et al., "Modeling word perception using the Elman network", Jul. 2008, 9 pages.
Pyo, et al., "Front Collision Warning based on Vehicle Detection using CNN", International SoC Design Conference, 2016, Oct. 2016.
Qi, et al., "PointNet++: Deep Hierarchical Feature Learning on Point Sets in a Metric Space", Jun. 7, 2017, 14 pages.
Qi, et al., "Volumetric and Multi-View CNNs for Object Classification on 3D Data", Apr. 29, 2016', 14 pages.
Suzuki, et al., "Topological Structural Analysis of Digitized Binary Images by Border Following", Apr. 1985, pp. 32-46.
Zhao, et al., "Pyramid Scene Parsing Network", Apr. 27, 2017, 11 pages.
Zou, "Free Space Detection Based on Occupancy Gridmaps", Apr. 2012, 70 pages.

\* cited by examiner

METHOD FOR GENERATING A DYNAMIC OCCUPANCY GRID

CROSS-REFERENCE TO RELATED APPLICATION

This application claims priority to European Patent Application Number 20164443.2, filed Mar. 20, 2020, the disclosure of which is hereby incorporated by reference in its entirety herein.

BACKGROUND

Advanced driver assistance systems (ADAS) have been developed to support drivers in order to drive a host vehicle more safely and comfortably. In order to perform properly and due to safety reasons, the environment in front of a host vehicle needs to be monitored e.g. in order to determine a collision free space in a lane in front of the host vehicle.

In order to determine such a collision free space in front of the host vehicle, a so-called occupancy grid technique has been proposed which analyzes the state of cells defined by a grid in front of the vehicle, i.e. if each cell is occupied, partly occupied, occluded or free. The occupancy grid is usually designed on the basis of a vehicle coordinate system wherein all cells of the grid have the same size and the same orientation within this coordinate system. That is, regarding the vehicle coordinate system the cells of the conventional occupancy grid are position invariant and time invariant.

In addition, the occupancy grid usually includes the same number of cells in both lateral and longitudinal directions with respect to the movement of the host vehicle. In order to guarantee a collision free space in front of the host vehicle, the number of cells may further be dynamically increased in lateral direction, especially if a strong curvature of the lane occurs in front of the host vehicle. Hence, such a square or rectangular grid has to include a huge number of cells which need to be processed by a processor and a memory of a vehicle controlling system.

An actual region of interest (ROI), however, which is relevant e.g. for the assistance systems of the host vehicle, usually covers a part of a square or rectangular occupancy grid only. For example, the region of interest may include the lane in which the host vehicle is currently driving and small areas located on the right and left sides of such a lane.

Therefore, the conventional occupancy grid usually includes a lot of unnecessary cells providing a lot of unnecessary data which are not relevant for the systems of the host vehicle, especially if such a lane has quite a strong curvature. These unnecessary data waste a lot of memory and may slow down processors of the vehicle controlling system. Hence, using the conventional occupancy grid technique, e.g. for trajectory planning or for the above mentioned assistance systems, is accompanied by a high computational effort.

Accordingly, there is a need to have a method which highly reduces the computational effort for generating an occupancy grid in front of a host vehicle.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for generating a dynamic occupancy grid in front of a host vehicle. According to the method, an indicator is detected for the course of a lane of a road in front of the host vehicle via a detection system of the host vehicle, and a base area is determined based on the detected indicator via a computer system of the host vehicle, wherein the base area is restricted to a region of interest in front of the host vehicle. A plurality of cells is defined via the computer system by dividing the base area in order to form the occupancy grid. For each cell of the occupancy grid, it is determined whether the cell is occupied at least partly by a detectable object via the computer system based on data provided by the detection system.

The detection system of the host vehicle may include a visual system, a radar system and/or a LIDAR system, whereas the computer system may include a processor and a memory. Since the base area is determined based on the indicator for the course of the lane, the base area which defines the dimensions and the number of the cells of the grid covers the region of interest in front of the vehicle only, i.e. including the lane and certain areas on the right and left sides of the lane. Therefore, the lateral size of the grid, i.e. perpendicular to the course of the lane, is decreased in comparison to a conventional occupancy grid which leads to a less number of cells which have to be taken into account.

Hence, less memory is required for such a dynamic occupancy grid reflecting the course of the lane, and the number of calculations needed for processing the data of the dynamic occupancy grid is reduced. Conversely, the resolution of the grid, i.e. the number of cells per unit area, may be increased without requiring additional memory. In both cases, however, the number of useless data generated by cells being located outside the region of interest is strongly reduced for a dynamic grid adapted to the course of the lane in comparison to a conventional occupancy grid.

In addition, the data provided by the dynamic occupancy grid are more suitable for further vehicle systems which rely on or use this data since the number of useless data provided by the grid is strongly reduced and the transferred data is therefore preprocessed regarding relevance. Hence, the performance of the further vehicle systems using the dynamic occupancy grid is improved, especially by reducing the total amount of transferred data.

The method may comprise one or more of the following features.

A reference line may be defined via the computer system along the lane based on the indicator, and the base area may be determined on both sides of the reference line. The reference line may be divided into segments, wherein for each of the segments a respective row of cells may be defined perpendicularly to the reference line. For each row of cells, a predetermined cell width and/or a predetermined number of cells may be defined.

For each segment, two respective straight lines may be defined perpendicularly to the reference line at a beginning and at an end of the segment, respectively, and each straight line may be divided into a predefined number of sections, wherein end points of the respective sections may define corners of a respective one of the plurality of cells. The segments of the reference line may have a predefined length. Alternatively, the segments of the reference line may have a variable length, wherein the variable length may depend on a distance of the segment with respect to the host vehicle. The variable length of the segments may increase when the distance of the segment with respect to the host vehicle increases.

The indicator may include right and/or left margins of the lane. Alternatively or additionally, the indicator may include markers for the center of the lane. The indicator may be detected via the detection system by using a visual system and/or a radar system of the host vehicle. The base area may be determined in accordance with a predetermined range of the visual system and/or of the radar system.

According to an embodiment, a reference line may be defined via the computer system along the lane based on the indicator, and the base area may be determined on both sides of the reference line. The definition of the reference line, for example in the middle of the lane, may be used for a straightforward adaptation of the base area to the course of the lane which is given by the indicator. Since the indicator may be measured e.g. by the detection system of the host vehicle, the reference line may be a straightforward means in order to "dynamically deform" the base area such that it reflects the course of the lane. Furthermore, the reference line may be represented by a polygon being adapted to measured indicator data. The use of such a reference line may further reduce the computational effort which is required to perform the method.

The reference line may be divided into segments, and for each of the segments, a respective row of cells may be defined perpendicularly to the reference line. If the reference line consists of a certain number of segments, an update of the dynamic occupancy grid may be simplified. For such an update of the occupancy grid, most of the segments and the respective row of cells belonging to these segments may be maintained, and merely the segments and corresponding cells being close to the host vehicle may be replaced by new segments and corresponding cells at the "far end" of the reference line with respect to the host vehicle. Furthermore, generating the dynamic occupancy grid may be facilitated by defining rows of cells corresponding to the segments of the reference line.

For each row of cells, a predetermined cell width may be defined, and alternatively or additionally, a predetermined number of cells may be defined. The predetermined cell width and the predetermined number of cells may include constant values. The lateral extension of the base area corresponding to the region of interest for the host vehicle may therefore be determined by the definition of the predetermined cell width and/or the predetermined number of cells. Constant values for the cell width and for the number of cells per row may again facilitate generating the dynamic occupancy grid.

For each segment, two respective straight lines may be defined perpendicularly to the reference line at a beginning and at an end of the segment, respectively. Each straight line may be further divided into a predefined number of sections. End points of the respective sections may define corners of a respective one of the plurality of cells. The predefined number of sections for each straight line perpendicular to the reference line may be a representation for the lateral extension of the dynamic occupancy grid which follows the course of the lane from one straight line to the next. The definition of the corners for the respective cells of the occupancy grid by using the end points of the sections may further facilitate generating the dynamic occupancy grid and may reduce the required computational effort.

The segments of the reference line may have a predefined length. In this case, generating the occupancy grid may be facilitated again, and the computational effort may be further reduced. Alternatively, the segments of the reference line may have a variable length which may depend on a distance of the segment with respect to the host vehicle. In detail, the length of the segments may increase when the distance of the segment with respect to the host vehicle increases.

That is, the size of the cells may be adapted within the region of interest by using a variable length of the segments. For example, it may be desired to have an increased resolution of the occupancy grid close to the host vehicle, and for regions having still a greater distance with respect to the host vehicle, less resolution is required e.g. for a proper performance of further vehicle systems like advanced driver assistance systems. Since a dynamic occupancy grid being restricted to the region of interest for the host vehicle and following the course of the lane in front of the host vehicle may include much less data and may need less computational effort than a conventional occupancy grid, the resolution of the grid may be increased within certain parts of the region of interest without extensively increasing the computational effort and therefore without sacrificing the most important advantages of the dynamic occupancy grid.

The indicator for the course of the lane may include right and/or left margins of the lane and, alternatively or additionally, markers for the center of the lane. Hence, available landmarks may be used as indicator for the course of the lane which may be easily detected by systems which are available anyway in the host vehicle. Therefore, the detection of the indicator including these landmarks, i.e. margins of the lane and/or markers for its center, may be performed without generating additional cost.

The detection system of the host vehicle for detecting the indicator may include a visual system and/or a radar system of the host vehicle. The visual system and the radar system are examples for systems which are available anyway in nowadays vehicles.

The base area may be determined in accordance with a predetermined range of the visual system and/or of the radar system. That is, the base area for generating the dynamic occupancy grid may be restricted longitudinally, i.e. along the lane in front of the host vehicle, by a predetermined and known range of the visual system and/or the radar system which may provide the indicator for the course of the lane in order to determine the base area and to define the dynamic occupancy grid. The dynamic occupancy grid may therefore be generated based on a predetermined length along the lane in front of the vehicle. This may again facilitate the overall generation of the dynamic occupancy grid.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
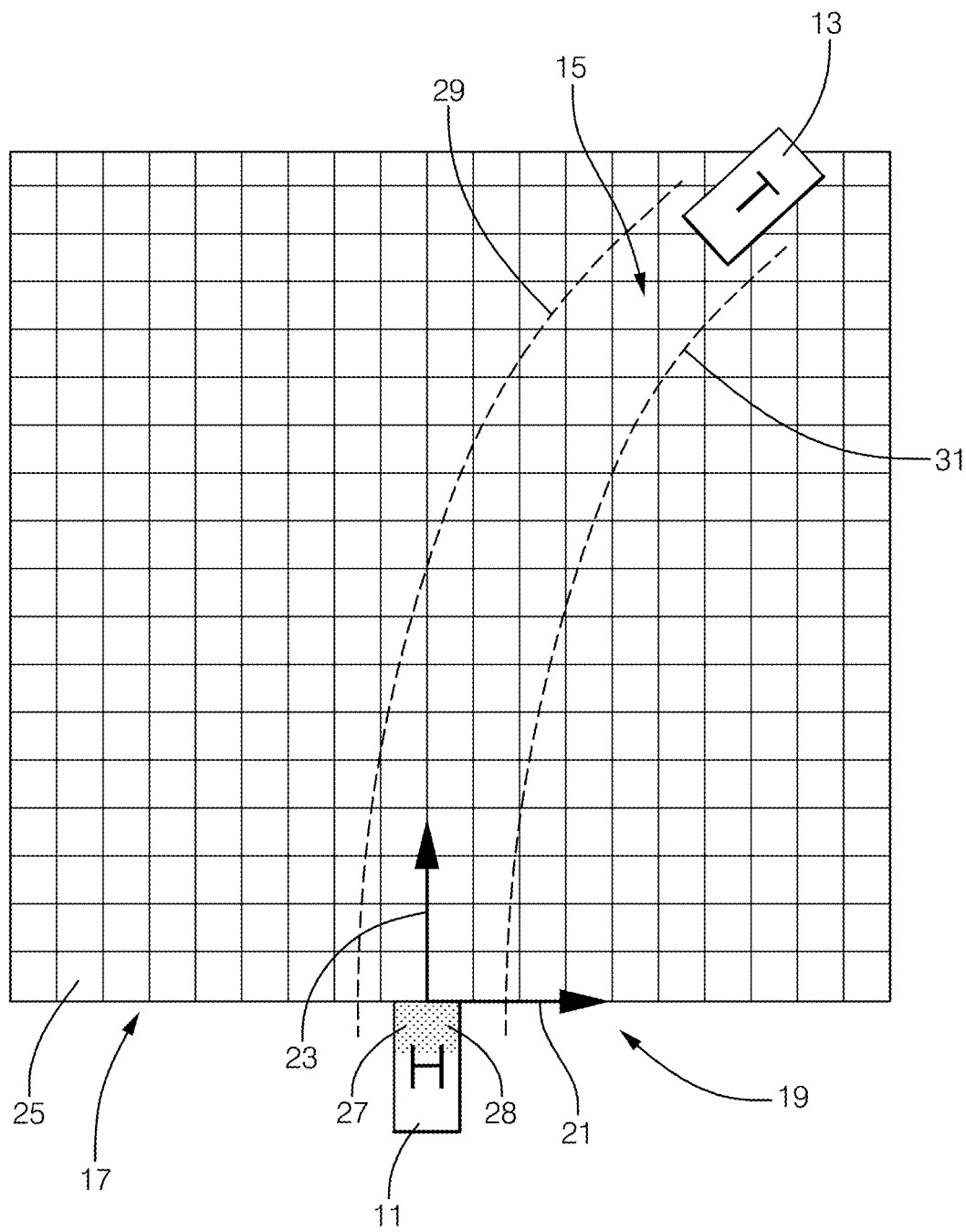
FIG. 1 is a schematic representation of an occupancy grid in front of a host vehicle according to the background art.

FIG. 1 schematically depicts a host vehicle 11 and a target vehicle 13 driving in the same lane 15 in front of the host vehicle 11. FIG. 1 further depicts a schematic representation of an occupancy grid 17 according to the background art which is defined with respect to a vehicle coordinate system 19 which is a Cartesian coordinate system including an x-axis 21 extending in a lateral direction with respect to the vehicle 11 and a y-axis 23 extending in a longitudinal direction in front of the host vehicle 11.

The occupancy grid 17 according to the background art includes a plurality of cells 25 which have a fixed dimension along the x-axis 21 and along the y-axis 23. That is, the length and the width of each cell 25 are predefined. In addition, the number of cells 25 of the occupancy grid 17 is also predetermined in the lateral and longitudinal directions, i.e. along the x-axis 21 and along the y-axis 23. That is, the occupancy grid 17 according to the background art always includes a fixed number of cells 25 in longitudinal direction and may include a predefined number of cells 25 in lateral direction, as shown in FIG. 1, regardless of the course of the lane 15 or the movement of the host vehicle 11.

The existence and the position of the target vehicle 13 are detected by a detection system 27 of the host vehicle 11. The detection system 27 includes a visual system and/or a radar system. The detection system 27 is also configured to detect a left margin 29 and a right margin 31 of the lane 15. The host vehicle 11 further includes a computer system 28 which includes a processor and a memory and which is configured to generate the occupancy grid 17.

As can be seen in the schematic representation of the occupancy grid 17 according to the background art, the occupancy grid 17 includes many cells 25 which are far away from the lane 15 in which the host vehicle 11 and the target vehicle 13 are driving momentarily. That is, the occupancy grid 17 according to the background art usually includes a huge number of cells which are outside a region of interest for the actual movement of the host vehicle 11 and for the systems of the host vehicle 11 which rely on or use the data being provided by the occupancy grid 17. Usually, for each of the plurality of cells 25 within the occupancy grid 17 it is determined whether an object or obstacle detected by the detection system 27 is present or not. In other words, it is determined for each cell 25 whether it is occupied by an obstacle or object. For the example as shown in FIG. 1, the cells 25 which are covered at least partly by the target vehicle 13 are regarded as occupied.

The region of interest which is relevant for the host vehicle 11 includes the lane 15 per se and some area beyond the left margin 29 and the right margin 31 within the close vicinity of the lane 15. Therefore, the occupancy grid 17 according to the background art includes a huge number of cells and unnecessary data from the regions outside the region of interest. This unnecessary data is usually processed by the computer system 28 of the host vehicle 11 and requires a corresponding unnecessary memory and processor performance. That is, usage of memory and processors of the host vehicle 11 are unnecessarily wasted when using an occupancy grid 17 according to the background art.

Figure 2:
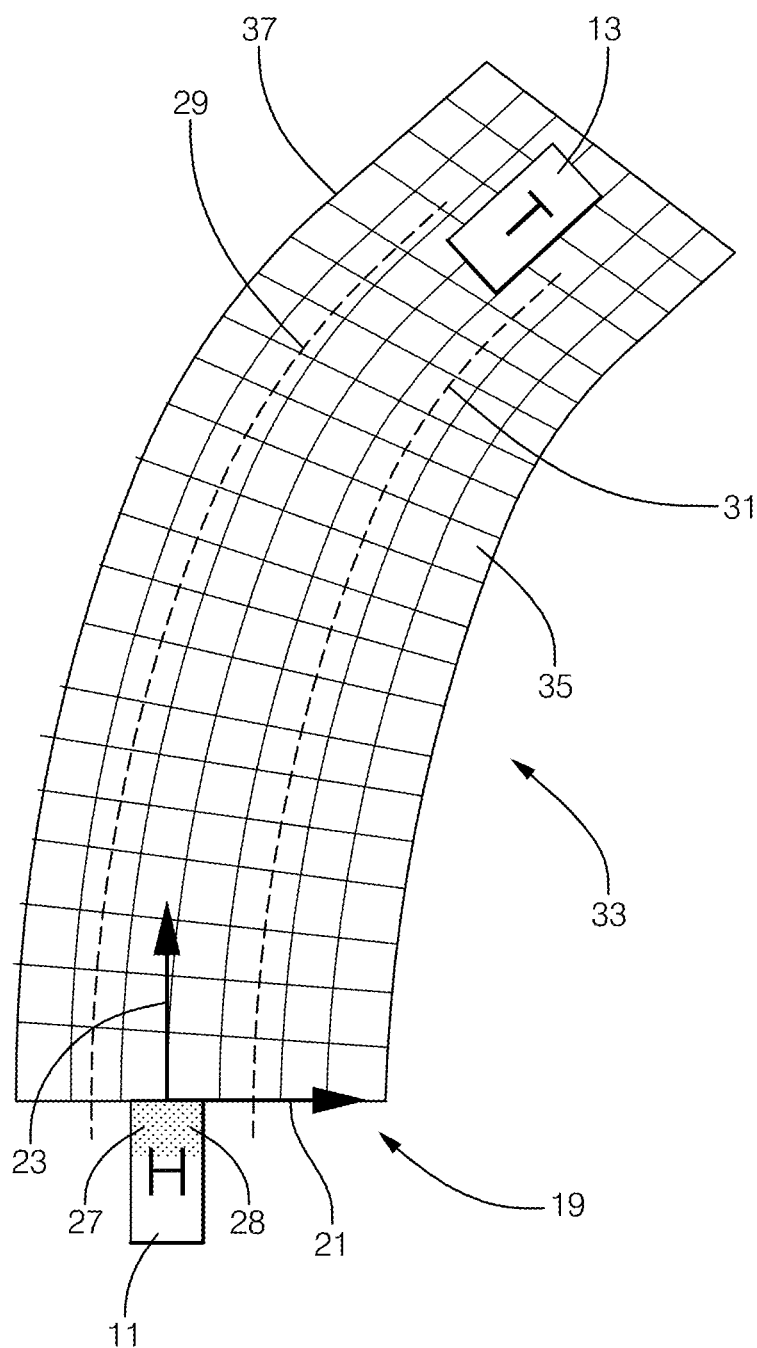
FIG. 2 is a schematic representation of a dynamic occupancy grid following the course of a lane according to the disclosure.

In contrast, FIG. 2 depicts a schematic representation of a dynamic occupancy grid 33 according to the disclosure. The dynamic occupancy grid 33 includes a plurality of dynamic cells 35 and is adapted to the course of the lane 15 in front of the host vehicle 11. In detail, the dynamic occupancy grid 33 is defined via the computer system 28 of the host vehicle 11 for a base area 37 which corresponds to a region of interest in front of the host vehicle 11. In order to define the base area 37, the left margin 29 and the right margin 31 of the lane 15 are detected by the detection system 27 of the host vehicle 11. Since the left margin 29 and the right margin 31 limit the lane 15, the left and right margins 29, 31 are used as indicators for the course of the lane 15 in front of the host vehicle 11.

As mentioned above, the base area 37 for the dynamic occupancy grid 33 is intended to cover the region of interest for the host vehicle 11. For covering this region of interest properly, some areas beyond the left margin 29 and beyond the right margin 31 are included in the base area 37. That is, some parts of adjacent lanes, sidewalks and/or further environment like ditches may also be relevant for the further movement of the host vehicle 11 and have therefore to be included into the base area 37. The base area 37 is further divided in a plurality of dynamic cells 35 in order to generate the dynamic occupancy grid 33.

When one compares the conventional occupancy grid 17 according to the background art as shown in FIG. 1 with the dynamic occupancy grid 33 according to the disclosure, the total number of cells 35 is strongly reduced in comparison to the total number of cells 25 of the conventional objective grid 17 without losing relevant information which is provided by the grids 17, 33 and which is relevant for e.g. the assistance systems of the host vehicle 11. This especially holds true if the lane 15 includes a strong curvature. In summary, the number of unnecessary cells and data and therefore unnecessary computational effort are strongly reduced when using the dynamic occupancy grid 33 reflecting the course of the lane 15 in comparison to the conventional objective grid 17.

Figure 3:
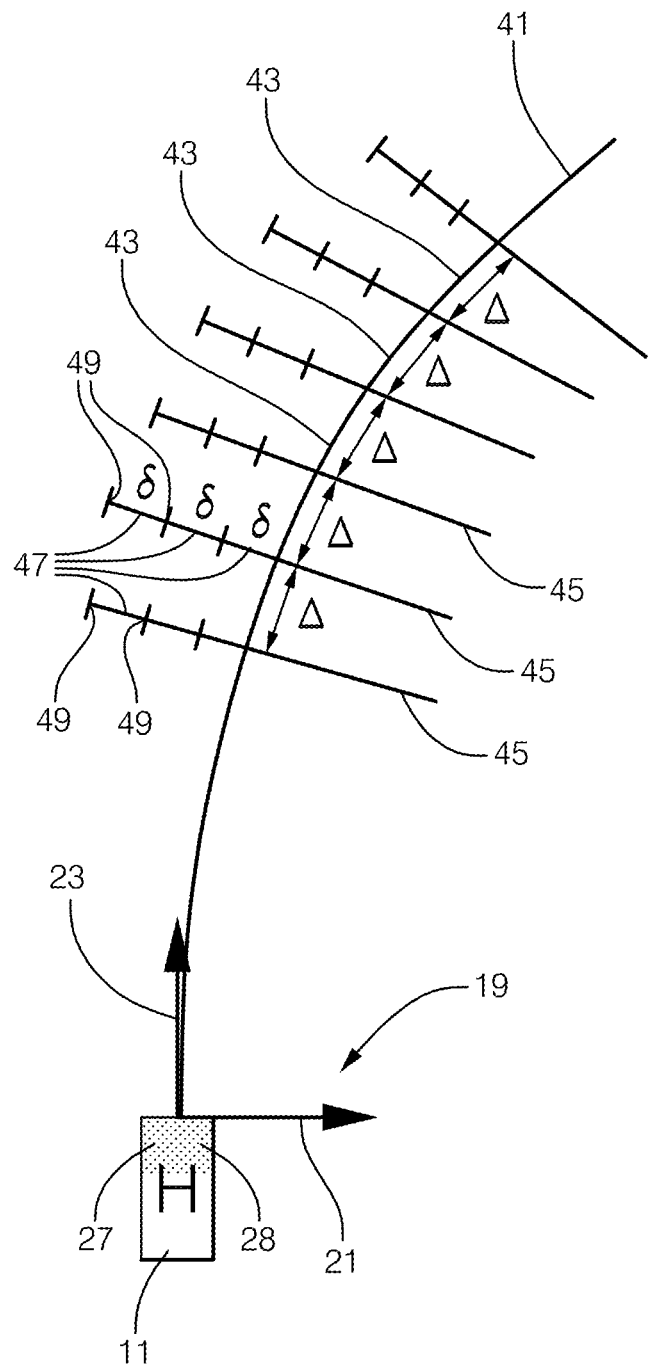
FIG. 3 depicts schematically how the dynamic occupancy grid is generated according to the disclosure.

FIG. 3 depicts in detail how the dynamic cells 35 of the dynamic occupancy grid 33 are generated via the computer system 28 of the host vehicle 11. A reference line 41 is defined which extends approximately in the center of the lane 15 in which the host vehicle 11 and the target vehicle 13 are driving momentarily. The reference line 41 is represented by a polynomial whose coefficients are derived from an indicator for the course of the lane 15 which is measured by the detection system 27 of the host vehicle 11, e.g. by measuring the course of the left margin 29 and the right margin 31 of the lane 15 as indicators for the course of the lane 15.

The reference line 41 represented by the polynomial is divided into a plurality of segments 43 having a constant length A along the reference line 41. For each segment 43, two straight lines 45 are defined extending perpendicularly to the reference line 41, respectively. That is, adjacent segments 43 have a common straight line 45 which delimits respective areas from each other which extend on both sides of the reference line 41 between the straight lines 45. The straight lines 45 are further divided into sections 47 having a constant length δ. Therefore, end points 49 of the respective sections 47 also have a constant distance δ from each other.

The end points 49 of the sections 47 are used in order to define corner points for a respective dynamic cell 35 (see FIG. 2). In detail, two end points 49 of a section 47 being adjacent to each other and belonging to a first straight line 45 define two corner points of a dynamic cell 35, whereas two further end points 49 of a section 47 of the adjacent straight line 45 having the shortest distances to the first straight line 45 define two further corner points for the dynamic cell 35. That is, the four corner points of each dynamic cell 35 are defined by respective end points 49 of sections 47 belonging to adjacent straight lines 45 and having the shortest distance with respect to each other.

Due to the curvature of the reference line 41, the size of the dynamic cells 35 varies within the dynamic occupancy grid 33, as can be recognized in FIG. 2. In addition, the length of the segments 43 may be varied as an alternative along the reference line 41. For example, close to the host vehicle 11 a short length of the segments 43 may be used, whereas the length of the segments 43 may increase when their distance increases with respect to the host vehicle 11.

In the example as shown in FIG. 3, each segment 43 defines a row of dynamic cells 35, wherein this row extends perpendicularly to the reference line 41. If a predefined number of cells 35 is used for each row of cells 35 belonging to a certain segment 43, a constant lateral width of the dynamic occupancy grid 33 is defined corresponding to a constant lateral extension of the base area 37 corresponding to and covering the region of interest in front of the host vehicle 11.

Alternatively, the number of cells 35 for each row may be adjusted to the curvature of the lane 15 and the reference line 41. In detail, a greater number of cells 35 may be considered on a first side to which the reference line 41 is curved, e.g. on the right side as shown in FIGS. 2 and 3, whereas a smaller number of cells 35 is taken into account on the second side from which the reference line 41 departs. Such a situation is shown in FIG. 2 in which more cells 35 are present at the "inner side" of the lane 15 beyond the right margin 31, whereas less cells 35 are considered at the "outer side" of the left margin 29 of the lane 15.

What is claimed is:

1. A method comprising:
   detecting an indicator for a course of a lane of a road in front of a host vehicle via a detection system of the host vehicle;
   defining, via a computer system of the host vehicle, a reference line along the lane based on the indicator;
   dividing the reference line into segments;
   defining, for each segment of the segments, two respective straight lines perpendicular to the reference line at a beginning and an end of the segment, respectively;
   dividing each straight line of the two respective straight lines into a predefined number of sections;
   determining, via the computer system, a base area based on the indicator, the base area being on both sides of the reference line and restricted to a region of interest in front of the host vehicle;
   defining, for each segment of the segments and via the computer system, a respective row of cells perpendicular to the reference line, corners of each cell of the respective row of cells being defined by endpoints of respective sections of the predefined number of sections;
   dividing, via the computer system, the base area by the cells of the respective rows of cells in order to form an occupancy grid;
   for each cell of the occupancy grid, determining whether the cell is occupied at least partly by a detectable object via the computer system based on data provided by the detection system; and
   based on a determination whether the cell is occupied at least partly by the detectable object, controlling, by a vehicle controlling system of the host vehicle, the host vehicle based on an indication of occupancy for each cell of the occupancy grid.

2. The method of claim 1, wherein the respective rows of cells are defined, for each row of cells, with a predetermined cell width.

3. The method of claim 1, wherein the respective rows of cells are defined, for each row of cells, with a predetermined number of cells.

4. The method of claim 1, wherein the segments of the reference line have a predefined length.

5. The method of claim 1, wherein:
   the segments of the reference line have a length; and
   the length being variably dependent on a distance of the segment with respect to the host vehicle.

6. The method of claim 5, the method further comprising:
   increasing the length of the segments when the distance of the segment with respect to the host vehicle increases.

7. The method of claim 1, wherein the indicator comprises at least one of right or left margins of the lane.

8. The method of claim 1, the method further comprising:
   detecting, via the detection system by using at least one of a visual system or a radar system of the host vehicle, the indicator.

9. The method of claim 8, wherein the base area is determined based on a predetermined range of the visual system or the radar system.

10. A computer system, the computer system comprising one or more processors configured to:
    detect, via a detection system of a host vehicle, an indicator for a course of a lane of a road in front of the host vehicle;
    define a reference line along the lane based on the indicator;
    divide the reference line into segments;
    define, for each segment of the segments, two respective straight lines perpendicular to the reference line at a beginning and an end of the segment, respectively;
    divide each straight line of the two respective straight lines into a predefined number of sections;
    determine a base area based on the indicator, the base area being on both sides of the reference line and restricted to a region of interest in front of the host vehicle;
    define, for each segment of the segments, a respective row of cells perpendicular to the reference line, corners of each cell of the respective row of cells being defined by endpoints of respective sections of the predefined number of sections;
    divide the base area by the cells of the respective rows of cells in order to form an occupancy grid;
    for each cell of the occupancy grid, determine whether the cell is occupied at least partly by a detectable object based on data provided by the detection system; and based on a determination whether the cell is occupied at least partly by the detectable object, control the host vehicle based on an indication of occupancy for each cell of the occupancy grid.

11. The computer system of claim 10, wherein the respective rows of cells are defined, for each row of cells, with a predetermined cell width.

12. The computer system of claim 10, wherein the respective rows of cells are defined, for each row of cells, with a predetermined number of cells.

13. The computer system of claim 10, wherein the segments of the reference line have a predefined length.

14. The computer system of claim 10, wherein
the segments of the reference line have a length; and
the length being variably dependent on a distance of the segment with respect to the host vehicle.

15. A non-transitory computer-readable storage medium comprising computer-executable instructions that, when executed, cause computer hardware components to:
detect, via a detection system of a host vehicle, an indicator for a course of a lane of a road in front of the host vehicle;
define a reference line along the lane based on the indicator;
divide the reference line into segments;
define, for each segment of the segments, two respective straight lines perpendicular to the reference line at a beginning and an end of the segment, respectively;
divide each straight line of the two respective straight lines into a predefined number of sections;
determine a base area based on the indicator, the base area being on both sides of the reference line and restricted to a region of interest in front of the host vehicle;
define, for each segment of the segments, a respective row of cells perpendicular to the reference line, corners of each cell of the respective row of cells being defined by endpoints of respective sections of the predefined number of sections;
divide the base area by the cells of the respective rows of cells in order to form an occupancy grid;
for each cell of the occupancy grid, determine whether the cell is occupied at least partly by a detectable object based on data provided by the detection system; and
based on a determination whether the cell is occupied at least partly by the detectable object, control the host vehicle based on an indication of occupancy for each cell of the occupancy grid.

16. The non-transitory computer-readable storage medium of claim 15, wherein the respective rows of cells are defined, for each row of cells, with a predetermined cell width.

17. The non-transitory computer-readable storage medium of claim 15, wherein the respective rows of cells are defined, for each row of cells, with a predetermined number of cells.

18. The non-transitory computer-readable storage medium of claim 15, wherein the segments of the reference line have a predefined length.

19. The non-transitory computer-readable storage medium of claim 15, wherein:
the segments of the reference line have a length; and
the length being variably dependent on a distance of the segment with respect to the host vehicle.

20. The non-transitory computer-readable storage medium of claim 19 comprising further computer-executable instructions that, when executed, cause the computer hardware components to:
increase the length of the segments when the distance of the segment with respect to the host vehicle increases.

* * * * *